US007294188B2

(12) United States Patent
Shao et al.

(10) Patent No.: US 7,294,188 B2
(45) Date of Patent: Nov. 13, 2007

(54) MIXING METHOD FOR FRICTION MATERIAL WITH A PRE-MIX IN A SINGLE MIXER

(75) Inventors: Xinming Shao, Novi, MI (US); Sunil Kesavan, Farmington Hills, MI (US)

(73) Assignee: Akebono Corporation (North America), Elizabethtown, KY (US)

( * ) Notice: Subject to any disclaimer, the term of this patent is extended or adjusted under 35 U.S.C. 154(b) by 82 days.

(21) Appl. No.: 11/312,997

(22) Filed: Dec. 20, 2005

(65) Prior Publication Data

US 2007/0142500 A1 Jun. 21, 2007

(51) Int. Cl.
*C09K 3/14* (2006.01)
*C08J 5/14* (2006.01)

(52) U.S. Cl. .................. 106/36; 260/998.13; 366/144; 366/348; 523/149; 523/153; 523/155; 523/156

(58) Field of Classification Search ................. 106/36; 260/998.13; 366/144, 348; 523/149, 153, 523/155, 156

See application file for complete search history.

(56) References Cited

U.S. PATENT DOCUMENTS 4,373,038 A * 2/1983 Moraw et al. .............. 523/156
4,384,054 A * 5/1983 Moraw et al. .............. 523/156
4,785,029 A 11/1988 Honma et al.
5,132,065 A 7/1992 Christie
5,576,358 A 11/1996 Lem et al.
5,871,159 A 2/1999 Carlson et al.
5,965,658 A 10/1999 Smith et al.
6,153,291 A 11/2000 Strasser
6,220,405 B1 4/2001 Kesavan et al.
6,413,622 B1 * 7/2002 Kobayashi ............... 428/293.1
6,451,872 B1 * 9/2002 Yamane ...................... 523/156
6,612,415 B2 * 9/2003 Yamane ................. 192/107 M
6,656,240 B2 * 12/2003 Chiba .......................... 51/307
6,670,408 B2 * 12/2003 Hikichi et al. .............. 523/149
6,797,094 B2 9/2004 Pacchiana et al.
6,863,968 B2 * 3/2005 Nagata et al. ........... 428/292.1
2003/0154882 A1 8/2003 Nagata et al.
2004/0030000 A1 * 2/2004 Takeuchi et al. ............ 523/155
2004/0175544 A1 * 9/2004 Saikatsu et al. ............ 428/143
2005/0051394 A1 3/2005 Huang et al.

FOREIGN PATENT DOCUMENTS

DE 3230441 A1 * 8/1982
GB 2 056 293 A 3/1981
JP 5-117633 A * 5/1993
JP 2001-311071 A * 11/2001

OTHER PUBLICATIONS

European Search Report

* cited by examiner

*Primary Examiner*—Anthony J. Green
(74) *Attorney, Agent, or Firm*—Dobrusin & Thennisch PC

(57) ABSTRACT

An improved method of producing a friction material for use in the production of brake pads. A first mixing step blends binder, fiber, and filler materials together in a mixer to create a pre-mix, with one of the materials doubling as a wetting agent promoting the homogeneity of the mixture. A second non-asbestos material is added to the pre-mix in the same mixer, and the two are mixed together to produce the final friction material.

17 Claims, 2 Drawing Sheets

MIXING METHOD FOR FRICTION MATERIAL WITH A PRE-MIX IN A SINGLE MIXER

FIELD OF THE INVENTION

The present invention relates to friction materials and, more particularly, to a mixing method for friction materials using a pre-mix in a single mixer.

BACKGROUND OF THE INVENTION

Pre-mixes have been used in the manufacturing of brake pad friction materials for some time. Friction materials produced with a pre-mix tend to process quickly, and exhibit improved performance characteristics in the completed brake pad as compared with pads produced without a pre-mix. For example, brake pads formed of pre-mixed materials tend to exhibit improved noise/vibration/harshness characteristics.

Typically, friction materials include rubber, fiber, and filler components. Usually an intensive rubber mixer is needed to masticate the binder material(s) and thoroughly mix it in with the other raw materials. To begin, a first material is added to the mixer. After mixing, the first material may be granulated to a desired size by a chopper to form a pre-mix. This pre-mix is then transferred to a second mixer, where other raw materials are added to the pre-mix. The resulting mixture is then mixed to produce the final friction material. The friction material can subsequently be formed into brake pads or other friction material products through any of a variety of methods, such as compression molding, for example.

The pre-mixing process may be relatively inefficient. First, granulating the premix in between the first mixer and the second mixer can be laborious and costly. Second, the premix has a limited shelf-life due to the tendency of any chemical components of the pre-mix to cure within a short period of time.

SUMMARY OF THE INVENTION

The present invention discloses a method of producing a friction material. Initially, a first non-asbestos material is added into a single mixer. The first non-asbestos material is comprised of at least one of a binder material, an abrasive material, and a filler material. At least one of the binder, abrasive, and filler materials doubles as a wetting agent. The first non-asbestos material is then mixed in the single mixer to form a pre-mix.

A second non-asbestos material is next added into the same single mixer. This second non-asbestos material is also comprised of at least one of the binder, abrasive, or filler materials, such that the addition of the second non-asbestos material results in at least one binder material, at least one abrasive material, and at least one filler material being present in the single mixer. The second non-asbestos material is then mixed with the pre-mix to create a friction material.

Further areas of applicability of the present invention will become apparent from the detailed description provided hereinafter. It should be understood that the detailed description and specific examples, while indicating the various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of the various embodiments is merely exemplary in nature and is in no way intended to limit the invention, its application, or uses.

Figure 1:
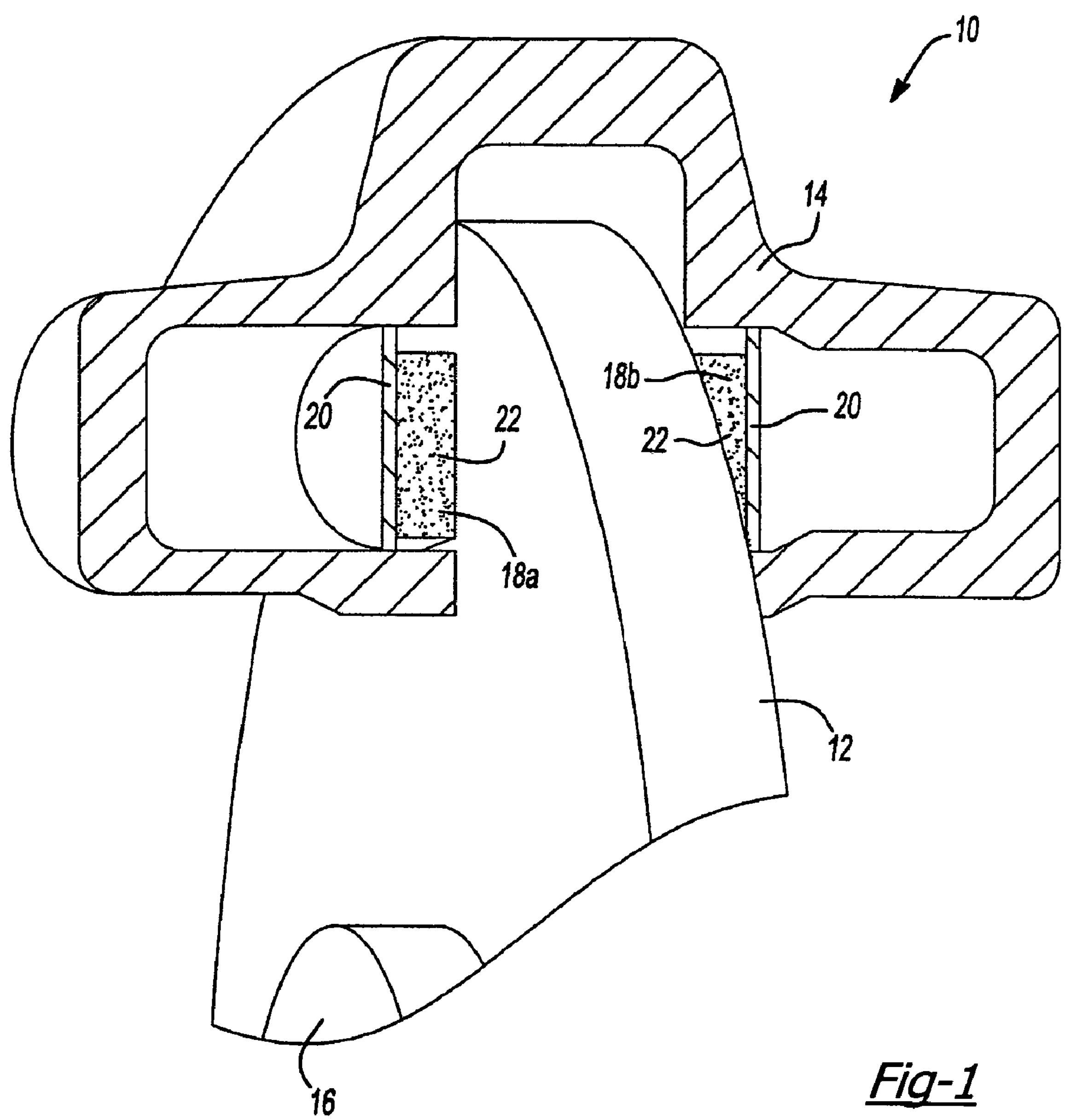
FIG. 1 is a cross-sectional view of a disc brake system.

In FIG. 1, the present invention is shown with reference to a simplified and exemplary vehicle disc brake system 10. The disc brake system 10 includes a rotor 12, a caliper 14, and a hub 16. The disc brake system 10 also includes a pair of outboard and inboard brake elements 18*a* and 18*b*, respectively, referred to hereinafter as brake elements 18 or brake pads 18. The brake elements 18 mount to the caliper 14 in a manner known in the art. Each of the brake elements 18 includes a structural backing 20 and a friction material 22. The friction material 22 mounts to the structural backing 20 using mechanical fasteners and/or chemical bonding (not shown). The brake elements 18 squeeze against rotor 12 to slow the rotation of the rotor 12 to thereby slow the vehicle (not shown) to a desired speed. As noted above, friction is produced when the brake elements 18 come into contact with the rotor 12; this in turn, causes the brake elements 18 to heat and ultimately wear. It will be appreciated that the above description is also applicable to a drum brake configuration, a clutch lining configuration and other non-vehicle configurations, for example, slowing machine parts. As such, the scope of the present invention is not to be construed as being limited solely to brake pad applications.

Figure 2:
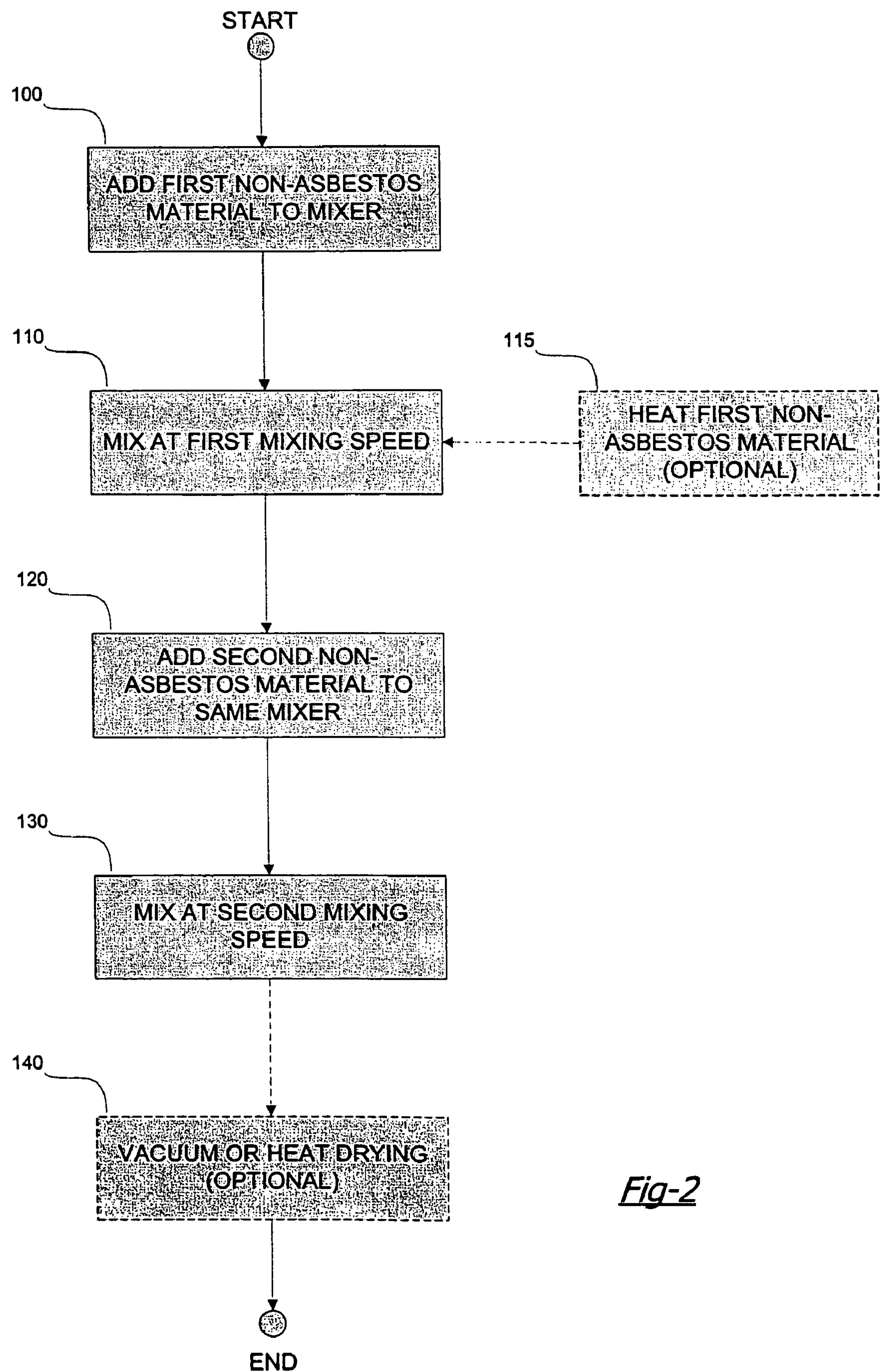
FIG. 2 is an exemplary flowchart of a friction material pre-mixing process in accordance with the present invention.

Referring to FIG. 2, a process for producing a friction material for use in brake pads, brake shoes, clutch linings and other suitable applications is illustrated in accordance with the present invention. Initially a first non-asbestos material is added to an intensive mixer, as shown at block 100. The mixer must be robust enough to granulate the materials properly. One such suitable mixer is a Littleford Ploughshare mixer commercially available from Littleford Day Inc. in Florence, Ky. Preferably, the mixer will allow for variable mixing speeds, and drying operations such as heat drying or vacuum drying, as may be necessary. The first non-asbestos material includes at least one of a binder material, a fiber material, and a filler material. The first non-asbestos material also includes a wetting agent, which may be a rubber latex (natural, styrene butadiene, acrylic, or silicone rubber), depolymerized rubber, cashew nut shell liquid based resin, or liquid phenolic resole resin. It is contemplated that the wetting agent may comprise about 0.5% to about 10% by weight of the first and second non-asbestos material. Chemical curative agents such as sulfur or peroxides may be added to the wetting agents as required to cure the first non-asbestos material during mixing, if desired. Other solvents may also be added to enhance the effect of the primary wetting agents. These solvents may include water, or alcohols such as isopropynol or propylene glycol. Water may be added directly, or in the form of wet aramid or cellulose pulp.

In one specific example, the first non-asbestos material is comprised of the materials listed below in Table 1, with percentages denoting their percent composition by volume of the pre-mix:

TABLE 1

Example First Non-Asbestos Material Composition by Volume

| Material | Composition (% by volume) |
|---|---|
| Graphite | about 22% |
| Magnesium Oxide Abrasive | about 12% |
| Iron Chromite Abrasive | about 4% |
| Barium Sulfate Filler | about 40% |
| Depolymerized Rubber | about 14% |
| Iron Oxide Abrasive | about 4% |
| Antimony Sulfide | about 4% |

The materials listed in Table 1 are then added to the mixer as discussed above.

Once the first non-asbestos material is added to the single mixer, it is mixed as shown at block 110 to create a pre-mix. This step is carried out at a first mixing speed. The mixing step continues until the first non-asbestos material is granulated to a desired size. The mixing speed may be varied as deemed appropriate for the given material composition. In the specific example referred to above, the first non-asbestos material is mixed at a mixer speed of approximately 1500 R.P.M. for approximately five minutes, or until granulated to a desired size, to create a pre-mix.

The vigorous mixing process may raise the temperature of the first non-asbestos material, which will promote the homogeneity of the resulting pre-mix, and the operation of any curing agents. Additionally, as shown at optional block 115, heat may be otherwise artificially added to the first non-asbestos material by any other means effective in promoting the curing action, if so desired.

A second non-asbestos material is next added to the pre-mix in the same mixer in which the pre-mix was created, as shown at block 120. This second non-asbestos material, like the first non-asbestos material, includes at least one of a binder, a fiber, and a filler material. The composition of the second non-asbestos material can be determined according to the desired composition of the final friction material to be produced, taking into account those materials already present in the pre-mix. In the specific example referred to above, the second non-asbestos material is comprised of the materials listed below in Table 2, with percentages denoting their percent composition of the second material by volume:

TABLE 2

Example Second Non-Asbestos Material Composition by Volume

| Material | Composition (% by volume) |
|---|---|
| Phenolic Resin | about 25% |
| Friction Dust | about 20% |
| Aramid Pulp | about 10% |
| Graphite | about 8% |
| Magnesium Oxide Abrasive | about 5% |
| Iron Chromite Abrasive | about 1% |
| Rubber Dust | about 4% |
| Barium Sulfate Filler | about 15% |
| Mineral Fiber | about 10% |
| Iron Oxide Abrasive | about 1% |
| Antimony Sulfide | about 1% |

For the specific example outlined in Tables 1 and 2, the second non-asbestos material should be added in a quantity such that it comprises about 72% of the total material present in the mixer by volume, with the pre-mix comprising about 28% of the total material present in the mixer by volume. The overall material composition of the material present in the mixer should therefore be as listed below in Table 3, with the material and percent composition by volume of the final friction material:

TABLE 3

Final Friction Material Composition by Volume

| Material | Composition (% by volume) |
|---|---|
| Phenolic Resin | about 18% |
| Friction Dust | about 14% |
| Aramid Pulp | about 7% |
| Graphite | about 12% |
| Magnesium Oxide Abrasive | about 7% |
| Iron Chromite Abrasive | about 2% |
| Rubber Dust | about 3% |
| Barium Sulfate Filler | about 22% |
| Mineral Fiber | about 7% |
| Depolymerized Rubber | about 4% |
| Iron Oxide Abrasive | about 2% |
| Antimony Sulfide | about 2% |

For this specific example, it should be noted that the relative material composition of the pre-mix and second non-asbestos material may be adjusted as required, so long as the end result still achieves the material composition in the final mix shown in Table 3.

After the second raw material mix is added to the same mixer, mixing continues, as shown at block 130. This second mixing step is performed at a second mixing speed. The second mixing speed may be less than, greater than, or equal to the first mixing speed. In the specific example referred to above, this final mixing step is carried out at about the same speed as for the first mix, approximately 1500 R.P.M., and continues for approximately five minutes, or until granulated to the desired size, to create the final friction material.

When the mixing is completed, and the mixture has achieved a homogeneous consistency, it may be necessary to dry the material with a vacuum drying or heat drying step, as shown at optional step 140. Whether this will be necessary will depend on the composition of the pre-mix and the second non-asbestos material, and the degree of moisture provided by the pre-mix. Pre-mixes having a higher moisture content will generally lead to a higher moisture content in the final friction material, and may require a longer or more robust drying step.

After the final friction material is completed, it may be processed in a variety of ways to form the final product, such as compression molding.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of producing a friction material, the method comprising:

adding a first non-asbestos material into a single mixer, said first non-asbestos material including a first portion of at least one of a binder material, an abrasive material and a filler material, wherein said at least one of said binder material, said abrasive material, and said filler material includes a wetting agent;

mixing said first non-asbestos material in said single mixer at a first mixing speed;

adding a second non-asbestos material into said single mixer, said second non-asbestos material including a remaining portion of said at least one of said binder material, said abrasive material and said filler material; and mixing said first and second non-asbestos materials in said single mixer at a second mixing speed, wherein the resulting mixture forms a friction material for a brake pad.

2. The method of claim 1, wherein said wetting agent is selected from the group consisting of a natural rubber latex, a styrene butadiene rubber latex, a acrylic rubber latex, a silicone rubber latex, a depolymerized rubber, a cashew nut shell liquid based resin, and a liquid phenolic resole resin.

3. The method of claim 1, wherein said wetting agent is about 0.5% to about 10% by weight of said first and second non-asbestos materials.

4. The method of claim 1, further comprising adding a chemical curative to said first non-asbestos material.

5. The method of claim 1, further comprising adding a solvent to said first non-asbestos material to enhance effect of the wetting agent.

6. The method of claim 5, wherein said solvent is selected from the group consisting of water and an alcohol.

7. The method of claim 1, further comprising increasing a temperature of said first non-asbestos material.

8. The method of claim 7, wherein said mixing of said first non-asbestos material in said single mixer at said first mixing speed increases said temperature of said first non-asbestos material.

9. The method of claim 1, wherein said first mixing speed is greater than said second mixing speed.

10. The method of claim 1, further comprising drying said first and second non-asbestos materials.

11. The method of claim 10, wherein said drying includes at least one of adding heat and vacuum drying.

12. A method of producing a friction material comprising:

adding a first non-asbestos material into a single mixer, said first non-asbestos material comprising:
- a first portion of a graphite material;
- a first portion of a barium sulfate filler material;
- a first portion of an antimony sulfide material;
- a first portion of an iron oxide abrasive material;
- a first portion of a magnesium oxide abrasive material;
- a first portion of an iron chromite abrasive material; and
- a wetting agent;

mixing said first non-asbestos material in said single mixer at a first mixing speed;

adding a second non-asbestos material into said single mixer, said second non-asbestos material comprising:
- a second portion of said graphite material;
- a second portion of said barium sulfate filler material;
- a second portion of said antimony sulfide material;
- a second portion of said iron oxide abrasive material;
- a second portion of said magnesium oxide abrasive material;
- a second portion of said iron chromite abrasive material;
- a phenolic resin material;
- a friction dust material;
- an aramid pulp material;
- a rubber dust material; and
- a mineral fiber material; and mixing said first and second non-asbestos materials in said single mixer at a second mixing speed, wherein the resulting mixture forms a friction material for a brake pad.

13. The method of claim 12, wherein said wetting agent comprises a depolymerized rubber material.

14. The method of claim 13, wherein said depolymerized rubber material is about 0.5% to about 10% by weight of said first and second non-asbestos materials.

15. The method of claim 13, wherein said depolymerized rubber material is about 4% by weight of said first and second non-asbestos materials.

16. The method of claim 12, wherein said first mixing speed is about equal to said second mixing speed.

17. The method of claim 12, wherein:

said phenolic resin material is about 18% by volume of said first and second non-asbestos materials;

said friction dust material is about 14% by volume of said first and second non-asbestos materials;

said aramid pulp material is about 7% by volume of said first and second non-asbestos materials;

said graphite material is about 12% by volume of said first and second non-asbestos materials;

said magnesium oxide abrasive material is about 7% by volume of said first and second non-asbestos materials;

said iron chromite abrasive material is about 2% by volume of said first and second non-asbestos materials;

said rubber dust material is about 3% by volume of said first and second non-asbestos materials;

said barium sulfate material is about 22% by volume of said first and second non-asbestos materials;

said mineral fiber material is about 7% by volume of said first and second non-asbestos materials;

said iron oxide abrasive material is about 2% by volume of said first and second non-asbestos materials; and said antimony sulfide material is about 2% by volume of said first and second non-asbestos materials.

* * * * *

UNITED STATES PATENT AND TRADEMARK OFFICE

CERTIFICATE OF CORRECTION

PATENT NO. : 7,294,188 B2
APPLICATION NO. : 11/312997
DATED : November 13, 2007
INVENTOR(S) : Xinming Shao et al.

It is certified that error appears in the above-identified patent and that said Letters Patent is hereby corrected as shown below:

Title Page;
Please amend/replace Paragraph (75) as follows:

Inventors: Xinming Shao, Novi, MI (US); Sunil Kesavan, Farmington Hills, MI (US); Walter R. Tarr, Franklin Lakes, NJ (US)

Signed and Sealed this

Sixteenth Day of March, 2010

David J. Kappos
*Director of the United States Patent and Trademark Office*